April 23, 1963 K. WILFERT 3,086,817
SEAT FOR A MOTOR VEHICLE
Filed Oct. 21, 1958
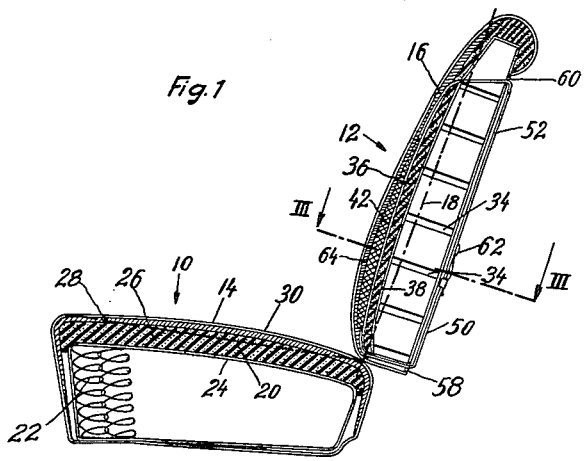
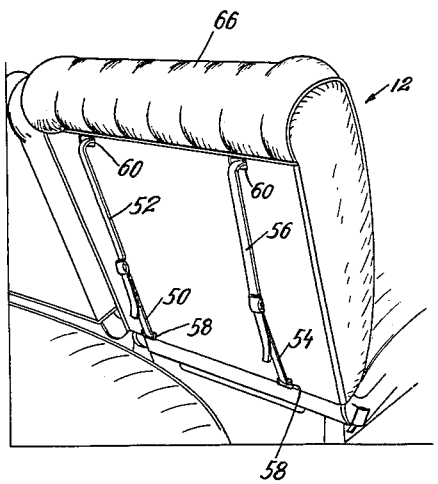
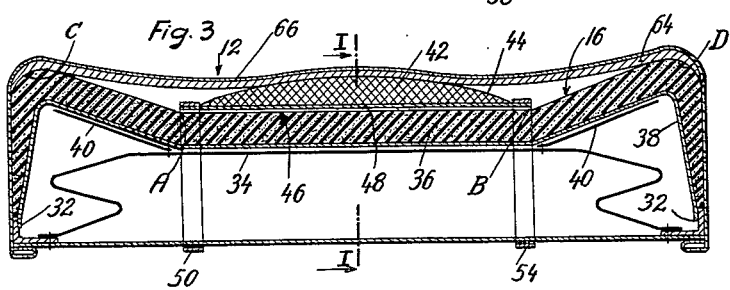
Inventor
KARL WILFERT
BY Dicke and Craig
ATTORNEYS 3,086,817
SEAT FOR A MOTOR VEHICLE
Karl Wilfert, Stuttgart-Degerloch, Germany, assignor to Daimler-Benz Aktiengesellschaft, Stuttgart Unterturkheim, Germany
Filed Oct. 21, 1958, Ser. No. 768,695
Claims priority, application Germany Oct. 23, 1957
3 Claims. (Cl. 297—284)

My invention relates to a seat, particularly for a motor vehicle, which conforms to the structure of the human body and, therefore, forms an orthopedic seat.

The objects of my invention are to provide an improved orthopedic seat supporting the upper body in its correct anatomic position and to brace it so effectively that no fatigue or even pathological deformations of the vertebra leading to lordosis or kyphosis will be experienced even under adverse conditions where a ride lasts many hours; to provide an improved orthopedic seat of a structure which is suitable for manufacture on a large scale and is capable of offering orthopedically correct conditions to persons of various sizes and proportions; to provide an improved seat of the character indicated which will effectively support the person seated thereon in the region of the loins and the shoulders so as to keep the vertebra in its natural normal position in which its lower section is curved forwardly; to avoid the disadvantages of prior automobile seats in which the lower section of the vertebra of the person seated thereon is pressed forward to an excessive degree liable to cause fatigue, the thighs being supported to an insufficient extent; to provide an automobile seat having a back cushion which supports a substantial portion of the weight of the body engaging same over a substantial area; and, finally, to provide an improved seat of neat appearance concealing its orthopedic character from view.

Further objects of my invention will appear from a detailed description of a preferred embodiment thereof following hereinafter with reference to the accompanying drawings. I wish it to be understood, however, that my invention is in no way limited to the details of such embodiment but is capable of numerous modifications within the scope of the appended claims and that the phrases and terms used in such detailed description have been chosen for the purpose of explaining the invention rather than that of restricting or limiting the same.

In the drawings

FIG. 1 illustrates a longitudinal section of the seat taken along a plane extending fore-and-aft of the motor vehicle, such plane being indicated in FIG. 3 by the line I—I, FIG. 2 is a perspective illustration of my improved seat viewed from the rear, and FIG. 3 is a cross section through the back cushion of the seat taken substantially along the line III—III of FIG. 1.

The seat shown in the drawings comprises a seat cushion 10 and a back cushion 12. The top face 14 of the seat cushion is rearwardly inclined and, when the seat is not subjected to the weight of a person seated thereon, is curved upwardly to a slight extent as shown. The front face 16 of the back cushion 12 likewise has a general rearward inclination and is curved forwardly. I have found that in order to achieve the objects of my invention, the angles of inclination of the surfaces 14 and 16 must be so chosen that the lower back of the person seated will form an angle of about 120° with the lower sections of the thighs. For this reason the angle between the surfaces 14 and 16 or, more specifically, between the chords 18 and 20 of the arcuate profiles thereof must include an angle of from 90° to 110° and preferably, an angle of 95°. Moreover, the front face 16 of the back cushion is provided with means for supporting the back of the person primarily in the regions of his loins and at his shoulders, such means preferably comprising a bulge positioned in the region of the loins.

The seat cushion 10 has a resilient core preferably formed by entwined helical springs 22 covered by a piece of cloth 24 which carries a mat 26 of rubber hair. This mat is covered by a layer 28 of cotton covered by a suitable cloth 30. The back cushion comprises a supporting frame including right and left frame bars 32 supporting a plurality of leaf-springs 34, each extending from one frame bar 32 to the other and having a substantially horizontal section located slightly in front of the chord 18 shown in FIG. 1 to support a mat 36 of rubber hair having an inner lining 38 of cloth. A pair of short leaf-springs 40 is fixed to each leaf-spring 34 in cantilever fashion so as to hold the mat 36 in the manner illustrated in FIG. 3 showing that the effective front face 16 of the back cushion has a transverse cross-sectional profile composed of a straight central section extending between the points A and B and of adjoining inclined sections extending from the points A and B to the rounded corners indicated at C and D.

Preferably, the bulge positioned in the region of the loins of the person seated on my improved seat is formed by a flat auxiliary cushion 42 which is mounted on the front face 16 of the back cushion for vertical adjustment and has a convex front face 44 and a length amounting to a fraction of the height of the back cushion 12. Preferably, the straight-profiled central area of the front face 16 of the back cushion 12 between the points A and B (FIG. 3) constitutes a guide-way 46 which is disposed parallel and in spaced relationship to the sides of the back cushion 12 and the auxiliary cushion 42 is seated on this guide-way 46 for up and down adjustment lengthwise thereof. Preferably, the auxiliary cushion 42 is provided with a flexible base layer 48 which laterally extends beyond the cushion 42 and is attached to suitable means for the up and down adjustment of the auxiliary cushion, such as straps 50, 52, 54 and 56. The straps 50 and 54 extend downwardly from the auxiliary cushion 42 through suitable slots 58 provided in the back cushion 12 near the lower end thereof and upwardly on the rear face of the back cushion 12. The straps 52 and 56 extend upwardly from the auxiliary cushion 42 and through suitable slots 60 provided in the back cushion 12 near the upper end thereof and downwardly on the rear side of the back cushion 12. The ends of the straps 50 and 52 are joined by a suitable buckle 62, and a similar buckle is provided to join the ends of the straps 54 and 56.

The auxiliary cushion 42 may consist of any desired material, such as foam rubber or the like which is sufficiently hard to insure maintenance of the convex shape of its front face 44 under normal loads. A flexible cover sheet which may be composed of a layer 64 of cotton and of a suitable fabric covering 66 fixed to the supporting frame including the bars 32 is loosely placed over the effective front face 16 so as to cover the auxiliary cushion 42 from view.

For the purpose of adjustment of the auxiliary cushion 42 the buckles 62 are opened, thus affording a possibility of pulling either straps 52, 56 outwardly for upward adjustment of the auxiliary cushion or of pulling straps 50 and 54 outwardly for downward adjustment. Thereafter, the buckles 62 are closed again so as to tightly tension the straps which will then keep the auxiliary cushion in its adjusted position preventing inadvertent displacement thereof.

For the purposes of my invention the auxiliary cushion 42 must be so adjusted that its bulging front face 44 will support the back of the person primarily in the regions of his loins. For this purpose, the cushion 42 constituting the bulge has preferably a width of from 8 to 10 inches between the points A and B, whereas the width of the back cushion between the points C and D is about twice that amount. The height of the bulge 44 measured from its lower end to its upper end is preferably 12 inches. The length of the seat cushion measured in fore-and-aft direction preferably amounts from 9 to 11 twelfths of the height of the back cushion, for instance, between 18 and 22 inches. As shown in FIG. 3, the thickness of the auxiliary cushion 42 tapers to the edges thereof. It preferably amounts to from $1/60$ to $3/60$ of the height of the back cushion and, in the embodiment shown, to about $3/4$ inch. Preferably, the crest of the bulge 44 is spaced from the straight line 18 extending through the top edge and the bottom edge of the front face 16 a distance amounting to from $1/20$ to $3/20$ of the height of the back cushion which is from 1.2 to 3.6 inches with a height of 24 inches of the back cushion 12. The crest of the bulge should be spaced from the lower end of the back cushion a distance amounting to $7/30$ of the height of the back cushion. The vertical adjustability of the auxiliary cushion 42 relative to the back cushion 12 amounts to from $3/16$ to $5/16$ of the height of the rear cushion and in the embodiment shown to 6 inches.

The above-stated dimensions, particularly the width of the bulge 44 between the points A and B, is quite essential. It has been found that where this width is too large, the person seated will feel uncomfortable after a short time and may even get pains in the region of the kidneys. If the width of the bulge is too small, however, it will exert an undue pressure upon the vertebra and may produce excessive friction upon the skin.

It is the purpose of the bulge 44 to maintain the upper body in an erect position under a slight pressure so as to avoid a rearward flexure of the vertebra under the effect of oscillations and shocks acting in vertical direction as such flexure is liable to urge the spinal disks rearwardly liable to produce damage, such as kyphosis. On the other hand, excessive forward flexure of the vertebra must be avoided in order to prevent damage that may lead to lordosis. By giving the bulge 44 the size and location specified hereinabove, I insure an orthopedically correct attitude of the person occupying my improved seat. The bulge 44 will bend the vertebra forwardly in the region of the loins to the desired extent. For this purpose it is material that the auxiliary cushion be neither too soft nor too hard in order to effectively support and brace the body and enables the back cushion 12 to support a substantial fraction of the weight of the body. Nevertheless, the bulge 44 will act on the body over a sufficiently large area to avoid discomfort. To this end the upholstery of my improved seat is so chosen that it has a limited flexibility and will not be too soft.

The bulge 44 may be easily provided on a back cushion of the type including a frame carrying transverse leaf-springs. Owing to the flexure produced by a transverse leaf-spring, a bend is produced at the point of the curvature which can be readily perceived with the naked eye. This bend is produced by the leaf-spring arranged at this point and the bend is supported by the spring which will be displaced relative to the normal position with respect to the other leaf-springs.

In order to make full use of the orthopedic effect of the back cushion it is important that the auxiliary cushion be properly adjusted in up or down direction since the bulge will cause discomfort unless its crest is adjusted to the proper level conforming to the proportions of the person accommodating the seat.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A seat for a motor vehicle comprising a seat cushion, a back cushion having a front face forming a guide-way disposed parallel and in spaced relationship to the sides of said back cushion and curved forwardly to form an arc, the chord of which includes an angle of from 90° to 110° with the top face of said seat cushion, an auxiliary cushion having a convexly curved front surface in a horizontal cross-sectional plane and a substantially flat back surface for slidable support thereof on said guide-way, and means for adjusting said auxiliary cushion along said guide-way, the width and height of said back cushion exceeding the width and height of said auxiliary cushion.

2. A seat adapted for normal occupancy by one person, comprising a seat cushion, a back cushion having a rearwardly inclined front face, an auxiliary cushion mounted on said front face for vertical adjustment and having a convexly curved front face in a horizontal cross sectional plane, said auxiliary cushion having an essentially flat rear face bearing against said front face of said back cushion, said auxiliary cushion having a thickness tapering toward the edges thereof, means to enable vertical adjustment of said auxiliary cushion, and a flexible cover sheet covering at least said front face of said back cushion and said auxiliary cushion mounted thereon.

3. An orthopedic seat comprising a seat cushion, a back cushion having a rearwardly inclined front face, an auxiliary cushion mounted on said front face for vertical adjustment thereupon, said auxiliary cushion having a convexly curved front face in a horizontal cross sectional plane, said back cushion being provided with aperture means adjacent the lower end and the upper end thereof, strap means extending through said aperture means and connected to said auxiliary cushion to enable vertical adjustment of said auxiliary cushion on said front face of said back cushion.

References Cited in the file of this patent

UNITED STATES PATENTS

| | | |
|---|---|---|
| 371,402 | Williamson | Oct. 11, 1887 |
| 1,236,517 | Wemple et al. | Aug. 14, 1917 |
| 1,463,334 | Popkin | July 31, 1923 |
| 1,917,264 | Kellogg | July 11, 1933 |
| 1,935,685 | White | Nov. 21, 1933 |
| 2,063,732 | Gailey | Dec. 8, 1936 |
| 2,185,758 | Todd et al. | Jan. 2, 1940 |
| 2,495,654 | Ford | Jan. 24, 1950 |
| 2,582,115 | Goodeve | Jan. 8, 1952 |
| 2,591,306 | Sherman | Apr. 1, 1952 |
| 2,647,560 | Huebener | Aug. 4, 1953 |
| 2,708,475 | Krewson | May 17, 1955 |
| 2,833,340 | Shapiro | May 6, 1958 |
| 2,843,195 | Barvaeus | July 15, 1958 |
| 2,894,565 | Conner | July 14, 1959 |

FOREIGN PATENTS

| | | |
|---|---|---|
| 26,639 | Great Britain | Dec. 31, 1901 |
| 850,372 | France | Sept. 11, 1939 |